Dec. 31, 1963   W. L. RUSSELL   3,115,775
METHOD AND APPARATUS FOR MEASURING THE PRESSURES
OF FLUIDS IN SUBSURFACE ROCKS
Filed Jan. 6, 1960
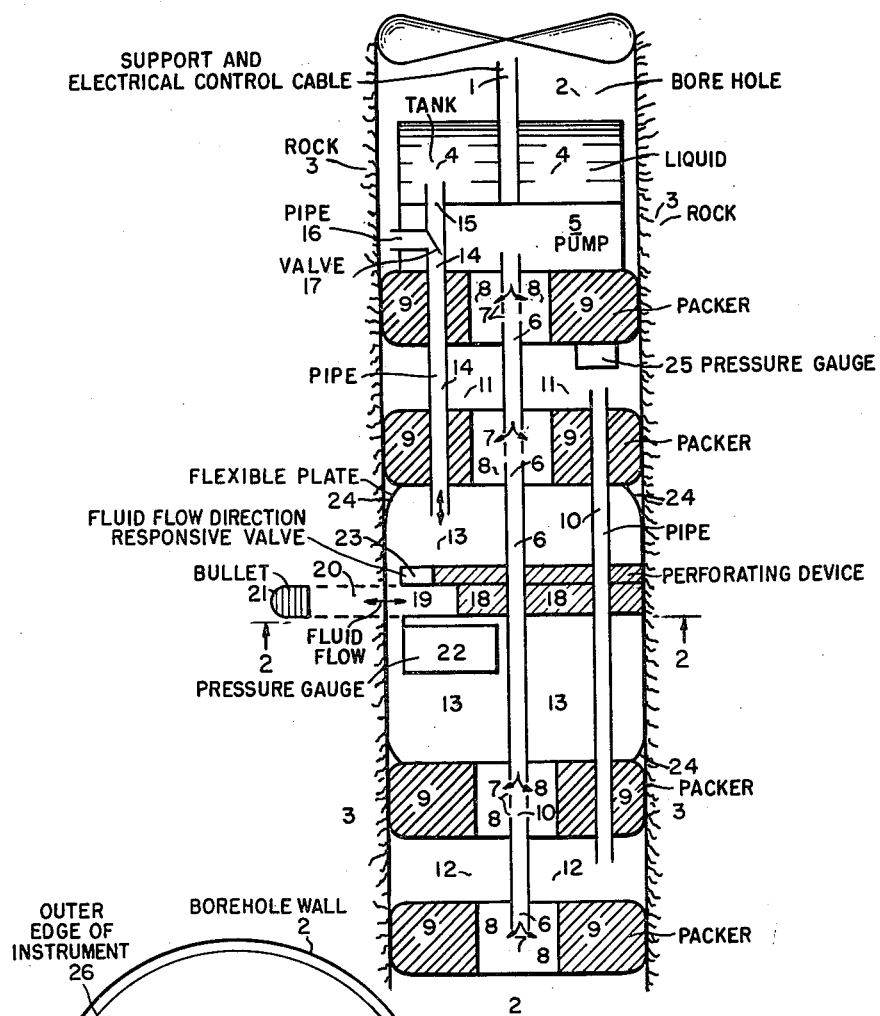
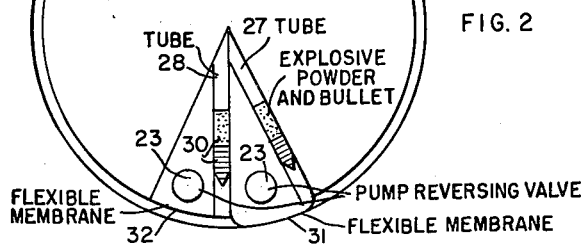
INVENTOR
William L. Russell

United States Patent Office 3,115,775
Patented Dec. 31, 1963

3,115,775
METHOD AND APPARATUS FOR MEASURING THE PRESSURES OF FLUIDS IN SUBSURFACE ROCKS
William L. Russell, 400 Brookside Drive, Bryan, Tex.
Filed Jan. 6, 1960, Ser. No. 807
8 Claims. (Cl. 73—152)

This invention relates to a method and apparatus for measuring the pressure of fluids encountered in bore holes. Although the method may be used in bore holes drilled in any manner, it is expected that the chief use of the method will be in wells drilled by the rotary method. Although the process can be used in cased wells, it is also expected that it will be used in uncased holes. In order to prevent caving of the formations and blow-outs of formations containing oil or gas, these uncased rotary-drilled bore holes are generally kept filled with mud fluid under pressures considerably greater than the pressure of fluids in the formations at the same depths in the bore holes. Under these conditions the walls of the hole opposite the permeable reservoir rocks are covered with a coating of mud known as the mud cake filtered from the mud fluid, and the pores of the permeable strata for distances from a few inches to several feet from the walls of the hole are filled with the water known as the mud filtrate which has seeped through the mud cake. Ordinarily this mud filtrate is lighter than the salt water which commonly fills the pores of the rocks at depths in regions producing oil and gas, and heavier than the oil and gas. Under these conditions the mud filtrate would rise or sink until it reached the top or bottom of the reservoir rocks, at which depths it would flow outward from the bore hole. Except at the tops and bottoms of reservoir rocks, the flow would therefore be up or down. Since surfaces of equal pressure, here called isobaric surfaces, are perpendicular to the direction of flow, these isobaric surfaces, except at the tops and bottoms of the reservoir rocks are level through the zones containing the original fluids and clear up to the walls of the bore holes. This means that the fluid pressures in the zones of the reservoir rocks which have not been invaded by the mud filtrate and which still contain their original fluids can be determined by pressure measurements in the invaded zones. There may, however, be very slight errors near the tops and bottoms of the reservoirs.

The value and useful applications of measurements of fluid pressure in wells have been greatly reduced by their inaccuracy. One source of error is the clogging of the passages in the rock connecting the fluids in the reservoir rocks with those in the bore hole. The pores and small passages adjacent to the walls of the hole are filled or clogged with mud driven into them by the pressure of the mud fluid. It is necessary to break through this zone in order to get a measurement, and the passages opened up may become clogged again during the measurement, thus preventing accurate measurement. Furthermore, this clogging may not be recognized, with the result that erroneous measurements may be interpreted as correct. Another source of error is leaks in the packers, which may not be recognized if they are slow. My invention eliminates or reduces to negligible proportions errors due to both these causes.

Measurements of fluid pressure in wells may be either be absolute or relative to the pressures not far above or below in the same well. By making relative measurements of pressures in this manner appreciable errors in depth measurements are avoided, and the results may be used to determine the fluid content of reservoir rocks, to determine the positions of fluid contacts, and to locate breaks or permeability barriers in reservoir rocks. These measurements may be made in cased wells by perforating the casing. Greater accuracy in measurements of fluid pressure should aid their use for estimating reserves, for determining the nature of the fluids in reservoir rocks, for well logging, for determining continuity of reservoir rocks, and calculating the elevations of fluid contacts.

The apparatus for applying my invention comprises four packers, between which there are three spaces. The fluid pressures are measured in the middle space. By means of firing a bullet or some other method, a passage for fluids is opened up through the zone in which the pores are sealed by mud. By means of a pump the pressure is reduced in the central one of the three spaces between the packers, until the fluid runs from the formation into the well. The pressure is then measured and the direction of flow changed. As soon as the fluid is flowing into the formation the pressure is again measured. While the pressure measurement is made with the fluid flowing out of formation, the pressure is maintained very slightly lower in the spaces on both sides. When the fluid is flowing into the formation, the pressure in the two outer spaces between the packers is kept very slightly above the pressure in the central space. There are therefore two series of pressure measurements, one made when the fluid is running out of the formation, and another, slightly higher, made when the fluid is running into the formation. The true value of the fluid pressure in the formation lies between the values given by these two series. Furthermore, these arrangements insure that no errors in pressure measurements are produced by leakage of the packers. The pressure measured when the fluid is running out of the reservoir cannot be increased by errors due to leakage, because the pressure in the outer spaces is slightly less than the pressure measured. Similarly the pressure measured when the fluid is running into the formation cannot be less than the pressure measured as a result of leakage, because the pressure in the outer spaces is slightly greater than the pressure in the inner space. Since the pressure measured when the fluid is running out of the formation cannot be greater than that measured in the spaces on both sides and the pressure measured when running into the hole cannot be less than what is measured in the spaces on both sides, it is evident that errors due to leakage of packers are eliminated. Errors due to sealing of the pores connecting the formation with the well are reduced to the slight differences between the pressures measured when the fluid is running into, and out of, the formation.

The present invention comprises any type or arrangement of apparatus which uses the principles given above, and it is not limited to be particular apparatus described below. In this apparatus, electrical connections, such as insulated wires, are assumed where necessary, and are not shown in the figures. The electrical communication with the surface, to control the apparatus from the surface, is also assumed. This is maintained by standard electronic devices, which are not described, since they are well known.

In the accompanying drawings:

FIG. 1 is a partial vertical sectional view of a well bore, with pressure measuring apparatus of this invention shown in operational position, and FIG. 2 is a sectional view of the apparatus of FIG. 1 looking along the line 2—2 of FIG. 1.

One type of apparatus which may be used in applying the method disclosed in this invention is shown in FIGS. 1 and 2. The apparatus is suspended from the multiconductor cable 1, FIG. 1, in the bore hole 2 in the rock 3. Since it is desirable to use clear liquid in the inner chamber, tank 4 contains a clear or mud-free fluid, which may be relatively much larger than is shown. Ordinarily, clear water would be used, since the invaded zone contains clear water, but oil may be used if the casing is expected to be perforated in oil zones. A device for filtering the water from the mud fluid may replace tank 4. Number 5 is the pump which is regulated from the surface with which it is connected electrically. Number 6 is the pipe which connects with the spaces 8 for fluid behind the packers 9, through the openings 7 in the pipe 6. When the instrument reaches the depth at which the measurement of the fluid in the reservoir rock is to be made, the packers, which are withdrawn away from the walls of the hole when the instrument is moving in the well, are forced outwards and pressed strongly against the walls of the hole by forcing liquid by means of the pump through the pipe 6 into the spaces 8. The pressure of the liquid in 8 forces the packers against the walls of the hole. The spaces 11 and 12 are between the outer and inner packers, and the inner space 13 is where the measurements are made. The instrument is generally suspended in mud fluid, the pressure of which is generally much greater than the fluid pressure in the formation. By means of the valve 17 in the pipe 14 it is possible to either withdraw clear fluid from the tank 4 and pump it into space 13, or force fluid from 13 through pipe 16 into the mud fluid in the well.

The first step in the measurement of the pressure, after the packers have been forced against the walls of the hole, is to reduce the pressure in the space 13 by pumping liquid out of it through the pipe 14. The pipe 10 open at both ends, keeps the pressure in spaces 11 and 12 equal. When the pressure in space 13 has been reduced so that it is close to the expected fluid pressure in the adjacent reservoir rocks, the bullet 21 is fired into the rock from position 19 in the disc-shaped segment 18 of the instrument. The hole or passage made by the bullet in entering the rock is shown by 20. This is only one of the possible means for opening a passage through the thin zone near the walls of the hole in which the pores of the rock are sealed by mud. Other ways are to force a bolt, nail or knife blade into the rock, or to clean the pores by reducing the fluid pressure in 13 considerably below the pressure of the fluid in the formation, and then applying ultrasonic vibrations.

When the bullet has been fired into the rock and the fluid pressure in 13 is reduced by pumping liquid out of it until liquid flows through the valve 23 into the space 13. In doing so it moves the valve 23 which causes the pump to force liquid back into space 13. As soon as the pressure in space 13 exceeds the fluid pressure in the formation, the fluid flows from space 13 into the formation, and this shifts the position of the valve 23, which in turn causes the fluid to be pumped out of space 13 again. In other words, the valve 23 is connected to pump in space 5 electrically so that tripping the valve causes the direction the pump acts to be reversed. In essence, the valve 23 is responsive to the direction of fluid flow, being actuated by a change in direction of the fluid flowing between the formation and space 13, to reverse the direction of the pump. While the liquid is running into the rock, the pressure in spaces 11 and 12 is maintained just a trifle more than that in 13, allowing for the difference in elevation, and while the fluid is running out of the formation into space 13, the pressure in 11 and 12 is maintained just a trifle less than in space 13, allowing for the difference in elevation. The pressures in space 13 are measured by the pressure gauge 22, and the pressures in spaces 11 and 12 are measured by gauge 25. The membrane or flexible plate 24 defines space 13 and prevents the mud from the walls from entering it. It is extended against the walls when the packers are extended.

The instrument contains one or more horizontal disc-shaped segments 18, FIG. 1, which contain the explosive powder and bullets, the mechanism for firing the bullets by control from the surface, and the valve 23, FIG. 1, for reversing the flow of the pumped fluid.

In FIG. 2 a horizontal plan of one of the segments is shown. This appears in FIG. 1 which is a vertical cross section, as 18. FIGURE 2 shows only two subdivisions of this segment, since all the subdivisions are alike. 2 is the wall of the bore hole, and 26 the outer edge of the instrument. Each subdivision contains the tubes 27 and 28 for the explosive powder and bullets 29 and 30 and the valve 23, for reversing the flow of the current, and flexible membranes 31 and 32, which are forced against the wall of the hole just before firing the bullet.

The use of an instrument capable of firing many bullets without returning to the surface makes it possible to make many pressure measurements without returning the instrument to the surface. This in turn permits very accurate measurements of relative depth. The cable is marked at the points during each measurement where it is at a fixed surface marker, and the distance between the two marks on the cable is then measured very accurately at the surface. By attaching a well-known magnetic device to the subsurface instrument when making measurements through casing, it is possible to determine the distance above or below the casing joints, which are used as permanent depth markers, particularly in reference to radiation well logs.

I claim:

1. A method of measuring fluid pressures in a bore hole, said method comprising the steps of:

setting four packers in said bore hole to define three spaces therebetween;

opening a passage to the formation adjacent the central space of said three spaces to permit fluid flow between said central space and said formation;

controlling the pressure within said central space to obtain fluid flow into said space from said formation;

measuring the pressure at which said fluid in flow occurs;

controlling the pressure within said central space to obtain fluid flow out from said central space into said formation;

measuring the pressure at which said fluid outflow occurs; and simultaneously maintaining a fluid pressure within the outermost two of said three spaces, which fluid pressure is equal as between said two outer spaces and differential as to said central space, the outermost spaces being at a higher pressure than said central space when said fluid flows into said formation and lower when said fluid flows out of said formation.

2. In apparatus for measuring fluid pressure within a formation adjacent a bore hole, the combination of:

four packers;

means carrying said four packers, said means being arranged to dispose said four packers within a bore hole in such spaced relation that when said packers are set they will define, with the walls of said bore hole, three adjacent spaces;

means supported by said carrying means for opening a passage to the formation for flowing fluid between a centrally disposed one of said three adjacent spaces and the formation, said centrally disposed space being defined by said packers and the confines of the well when said packers are set;

means operably arranged with said packers for regulating the fluid pressures within each of said spaces when said packers are set to permit flow between the formation and said central space selectively, either into or out from the formation; and means for measuring the pressure in said central space.

3. A method of measuring fluid pressures in a formation adjacent a bore hole, said method comprising the steps of;

setting packers in said bore hole to define at least one space therebetween;

opening a passage to the formation adjacent said space to permit fluid flow between said space and said formation;

controlling the pressure within said space to obtain fluid flow into said space from said formation;

measuring the pressure at which said fluid inflow occurs;

controlling the pressure within said space to obtain fluid flow out from said space into said formation; and measuring the pressure at which said fluid outflow occurs.

4. A method, as described in claim 3, wherein the error due to leakage into or out of the said one space between packers from an adjacent space, within the confines of the bore hole, on the side of the packers opposite said one space, is substantially reduced by maintaining said adjacent space at a higher pressure than said one space when said fluid flows into the formation and by maintaining said adjacent space at a lower pressure than said one space when said fluid flows out of the formation.

5. In apparatus for measuring fluid pressure within a formation adjacent a bore hole, the combination of;
packers;
means carrying said packers,
said means being arranged to dispose said packers within a bore hole in such spaced relation that when said packers are set they will define, with the walls of said bore hole a central space;
means supported by said carrying means for opening a passage to the formation for flowing fluid between said central space and the formation when said packers are set;
means operably arranged with said packers for regulating the fluid pressure within the central space when said packers are set to permit flow between the formation and said central space selectively, either into or out from the formation; and
means for measuring the pressure in the central space.

6. Apparatus, as described in claim 5, wherein,
said regulating means includes means for automatically reversing the direction of fluid flow between said central space and the formation.

7. Apparatus, as described in claim 5, wherein,
said opening means includes a perforating device that produces a hole in the formation at said central space.

8. Apparatus, as described in claim 5, wherein,
said regulating means includes,
a reservoir of fluid,
a conduit connecting said reservoir to said central space,
a pump arranged to force said reservoir fluid through said conduit into and out of the central space,
means for sensing the direction of flow of fluid between said formation and the central space operably arranged with said pump to control the direction of fluid flow through said conduit,
said pump and said direction sensing means being operable to control the flow of fluid from the central space to said conduit when fluid flows into the central space from the formation, said central space through and fluid flow to said conduit when fluid flows out of the central space into the formation.

References Cited in the file of this patent
UNITED STATES PATENTS

| | | |
|---|---|---|
| 2,201,096 | Kerman | May 14, 1940 |
| 2,459,499 | Castel | Jan. 18, 1949 |
| 2,705,460 | Burdick | Apr. 5, 1955 |
| 2,816,612 | Hutchison et al. | Dec. 17, 1957 |